(12) United States Patent
Muller

(10) Patent No.: US 7,008,137 B2
(45) Date of Patent: Mar. 7, 2006

(54) COVER FOR A DRAINAGE ARRANGEMENT AND A METHOD OF PRODUCING SUCH AN ARRANGEMENT

(75) Inventor: Michael Muller, Kiel (DE)

(73) Assignee: ACO Severin Ahlmann GmbH & Co., KG, Rendsburg (DE)

( * ) Notice: Subject to any disclaimer, the term of this patent is extended or adjusted under 35 U.S.C. 154(b) by 0 days.

(21) Appl. No.: 10/297,740

(22) PCT Filed: Apr. 23, 2001

(86) PCT No.: PCT/EP01/04574

§ 371 (c)(1),
(2), (4) Date: May 1, 2003

(87) PCT Pub. No.: WO01/94704

PCT Pub. Date: Dec. 13, 2001

(65) Prior Publication Data

US 2003/0185628 A1  Oct. 2, 2003

(30) Foreign Application Priority Data

Jun. 8, 2000 (DE) .................................... 100 28 355

(51) Int. Cl.
 *E01F 5/00* (2006.01)

(52) U.S. Cl. ........................... 405/38; 405/48; 404/4
(58) Field of Classification Search ................ 405/38, 405/40, 43, 45, 48; 404/2, 4; 210/163, 164, 210/165, 473, 474, 477; 52/169.5, 302.3
 See application file for complete search history.

(56) References Cited

U.S. PATENT DOCUMENTS 6,113,311 A  *  9/2000  Becker et al. ............... 405/119

FOREIGN PATENT DOCUMENTS

| DE | 42 37 237 | 5/1993 |
|----|-----------|--------|
| DE | 44 10 482 | 3/1995 |
| DE | 298 11 27 | 1/1999 |
| EP | 0 469 265 | 2/1992 |
| EP | 0 578 445 | 1/1994 |
| EP | 0 763 631 | 3/1997 |
| GB | 2 261 242 | 12/1993 |
| JP | 11-247279 | * 9/1999 |

OTHER PUBLICATIONS

Patent Abstracts of Japan & JP 3–244702. Oct. 31, 1991.
Patent Abstracts of Japan & JP 11–247279. Sep. 14, 1999.
"Vorteile bei Sonderanwendungen". *S & T*, vol. 10, pp. 49 (1994) and English translation.

* cited by examiner

*Primary Examiner*—Michael Safavi
(74) *Attorney, Agent, or Firm*—Merchant & Gould P.C.

(57) ABSTRACT

The invention relates to a cover (1) for a drainage channel (2) to be installed in the ground to drain the surface of an area. The cover (1) comprises a substantially planar portion (3) which is constructed so as to cover an opening at the top of the drainage channel (2) and which comprises a projection (5) that extends upward from the planar portion (3). The projection (5) defines an inlet (7) through which the water that runs off from the surface to be drained can enter the drainage channel. In addition, the planar portion (3) defines comprises supplementary apertures (9) to receive water that has percolated down to its lower level.

6 Claims, 3 Drawing Sheets

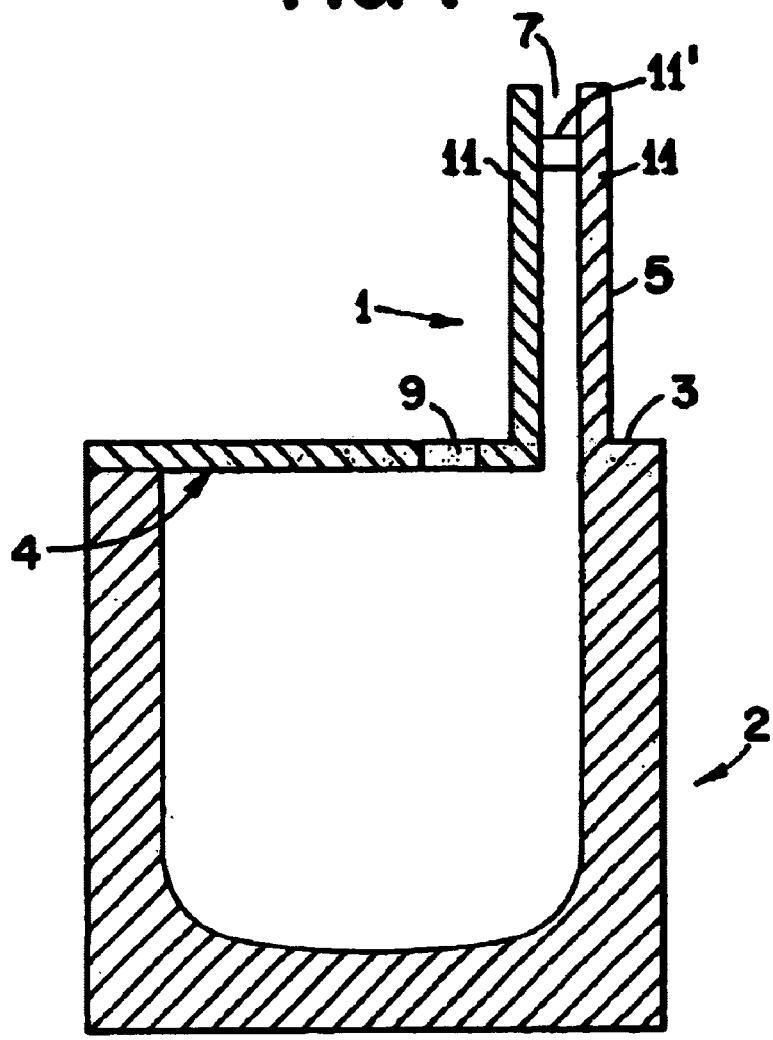

COVER FOR A DRAINAGE ARRANGEMENT AND A METHOD OF PRODUCING SUCH AN ARRANGEMENT

FIELD OF THE INVENTION

The present invention relates to a cover for a drainage channel to be installed in the ground to drain the surface of an area, and to a method of producing a drainage arrangement incorporating the cover.

BACKGROUND OF THE INVENTION

Drainage systems for conducting away surface water collected from a large area, such as a pedestrian zone and comparable areas for parking cars, underground garages and so on are already known. For such large areas linear drainage systems are used, in which a set of individual channels lined up in a row are buried in the ground and the openings at the tops of the channels are covered with gratings shaped in various ways and made of diverse materials. However, it is becoming increasingly common to pave areas of this kind not with concrete or asphalt but rather with paving stones or hollow blocks. The presence of grating-type drain covers impairs the aesthetic effect of the pattern of paving stones, and the appearance of the area to be drained is disrupted by the contours of the drainage system.

In order to achieve an inconspicuous drainage of paved areas, drainage channels are provided with specially constructed frames on which standard shaped stones are placed and kept in position in such a way that an opening in the form of a slot is left between the shaped stones. Through this slot the surface runoff can enter the drainage channels. Disadvantages of such drainage systems are on one hand the need for frames, which much be matched to the size of the particular paving stones or hollow blocks being used, and on the other hand the difficulty of fitting the frames to the channels when the area is being paved.

The German patent DE 42 37 237 A1 discloses a cover element for a drainage channel that consists of two longitudinally extending L-shaped parts in opposite orientations, each of which comprises an upright section and a section so shaped that it partially covers the drainage channel; the arrangement is such that the adjacent upright sections define between them a slot through which the surface runoff can flow into the drainage channel. This drainage system is both simple to construct and usable with every size or color of paving stones or hollow blocks.

When a separating or sealing layer is provided below the pavement, to ensure that water percolating through the pavement is prevented from entering underground structures such as a parking garage, this percolating water must be conducted away through many separate, punctate drainage holes, which is complicated and expensive.

BRIEF SUMMARY OF THE INVENTION

The object of the invention is to provide an inconspicuous drainage system both for a superficial level and also for a deeper level, which is simple and economical to manufacture, that can be installed in the ground, and that can effectively conduct away both surface runoff and percolating water.

Essentially, in the invention drainage at two levels is ensured by a cover for a drainage channel, such that the cover is on one hand economical, easy and simple to manufacture, and on the other hand it can readily be installed on the drainage channel.

The cover in accordance with the invention is constructed such that it comprises a substantially planar portion that serves to cover an opening at the top of the drainage channel, and a projection extending upward from the planar portion, which defines an inlet. Through this inlet flows the water that runs off from the superficial level. The drainage of a second, deeper level is ensured by supplementary apertures formed within the planar portion. Through these supplementary apertures flows the water that has penetrated through a drain layer and has been retained by a damp-proof sheet, so that this percolating water can be carried away in the drainage channel.

Preferably these supplementary apertures are disposed at substantially regular distances from one another over the entire length of the planar portion. This arrangement guarantees that the percolating water will be reliably collected and guided into the drainage channel. The apertures are produced by a cutting-press method prior to installation, so that their shape can be oval, circular, rectangular or triangular.

A preferred exemplary embodiment of the cover in accordance with the invention provides for the projection to be defined by two upright plates that form a drainage slot and are symmetrically disposed with respect to the midplane of the cover. In such an embodiment the apertures are distributed in the planar portion on the two sides.

In case the drainage system is to be used for a roadway bounded at the side by a curbstone, it is advantageous for the projection defined by two upright plates to be disposed near one side edge of the cover in accordance with the invention. In this embodiment the supplementary apertures are disposed in the planar portion on one side.

The cover can preferably be made of stainless steel, cast iron or galvanized steel. Thus the cover becomes relatively light in weight as well as simpler to manufacture, in comparison to covers made of concrete. Furthermore, such steel structures can be produced in different heights and hence can be matched to the heights of the structures already present on-site. The vertical sections can also be so constructed that their height is adjustable.

The invention further includes the essential idea of constructing a drainage arrangement with the cover in accordance with the invention in such a way that at least one edge region of the planar portion of the cover is covered by a damp-proof sheet that separates an upper paving layer of the surface to be drained from a lower supporting layer. Because of the impermeability of the damp-proof sheet the percolating water runs off to the side and can be effectively guided into the drainage channel through the apertures disposed in the planar portion.

Preferably the whole planar portion of the cover is covered by the damp-proof sheet, in which case openings are cut into this sheet of a size and at positions such that they coincide with the apertures in the planar portion. By this means the damp-proof sheet can be securely placed on the cover, so that reliable guidance of the percolating water into the drainage channel is ensured.

The damp-proof sheet is not put in place until after the cover has been set onto the drainage channel. It can be fixed in place by adhesive or the like. Only after the damp-proof sheet has been placed on the planar portion of the cover are openings cut into the damp-proof sheet, which correspond in position and size to the apertures in the planar portion. Thus entry of the percolating water into the supporting layer is prevented and conduction of the percolating water into the drainage channel is guaranteed.

Examples of the invention will now be described with reference to the attached drawings.

BRIEF DESCRIPTION OF THE SEVERAL VIEWS OF THE DRAWINGS

FIG. 4 is another cross sectional view of a cover for a drainage arrangement that has been set onto a drainage channel.

DETAILED DESCRIPTION OF THE INVENTION

Figure 1:
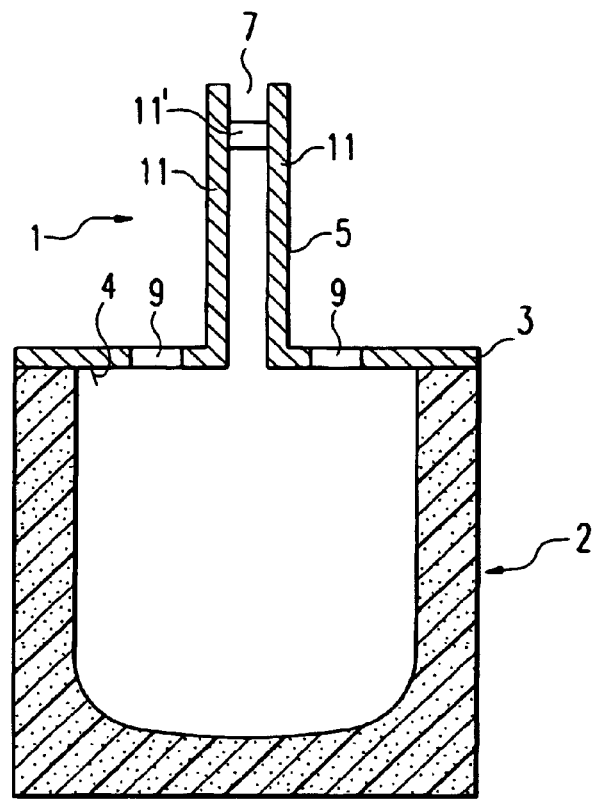
FIG. 1 is a cross sectional view of a cover for a drainage arrangement that has been set onto a drainage channel.

In the following description, the same reference numerals are used for identical parts or parts with identical actions.

In the case of large surface areas, linear drainage systems are used. These comprise a network of drains running under the surface of the ground. The drains are constructed of individual channels made of concrete polymer and connected to one another, on the apertures at the top of which covers are mounted.

FIG. 1 shows in cross section a U-shaped drainage channel 2 on which is mounted a cover 1 in accordance with the invention, made of stainless steel. The cover 1 in accordance with the invention is fixed to the drainage channel 2 by a form-fitting or similar connection. Alternatively, the cover 1 can be seated freely on a steel frame integrated with the channel. The cover 1 is so formed as to cover an opening 4 at the top of the drainage channel 2 and consists of a planar portion 3 and a vertical projection 5 that extends upward from the planar portion 3, towards the surface. The projection 5 forms an opening, the inlet 7, through which water on the surface can run off, into the drainage channel 2. The inlet 7 has the shape of a slot, being formed by two upright plates 11 of the projection 5. The upright plates 11 are held at a required distance from one another by spacers 11'. The spacers 11' are disposed at regular intervals over the entire length of the cover 1. The planar portion 3 of the cover 1 comprises supplementary apertures 9 that serve to receive water that has percolated through to a lower level, and to guide the percolated water into the drainage channel 2.

Figure 2:
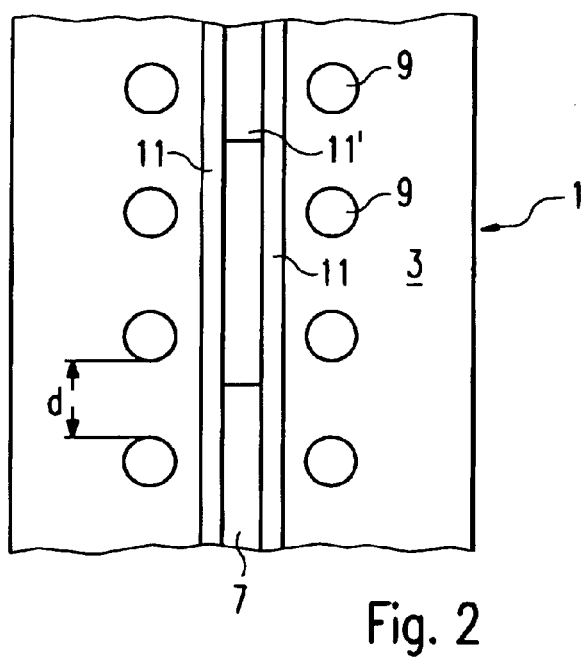
FIG. 2 is a plan view of the cover shown in FIG. 1.

FIG. 2 is a plan view of a cover 1 in accordance with the invention. In this embodiment of the cover 1 the upright plates 11, which define an inlet 7 in the form of a slot, are disposed symmetrically with respect to the midplane of the cover 1. The apertures 9 in the planar portion 3 are thus distributed on the two sides and in a row over the entire length of the planar portion 3. The apertures 9 are disposed at regular distances d from one another and are prefabricated by a cutting-press method. These apertures 9 can be not only circular, as shown in FIG. 2, but alternatively square or triangular. The upright plates 11 are separated by the distance required for the inlet 7 by means of spacers 11'.

In the embodiment according to FIG. 4 the upright plates 11, which define a drainage slot, are disposed close to one side edge of the cover 1. In this embodiment the apertures 9 are on one side in the planar portion 3, where they are disposed over the entire length of the planar portion 3 and are spaced apart at regular intervals.

Figure 3:
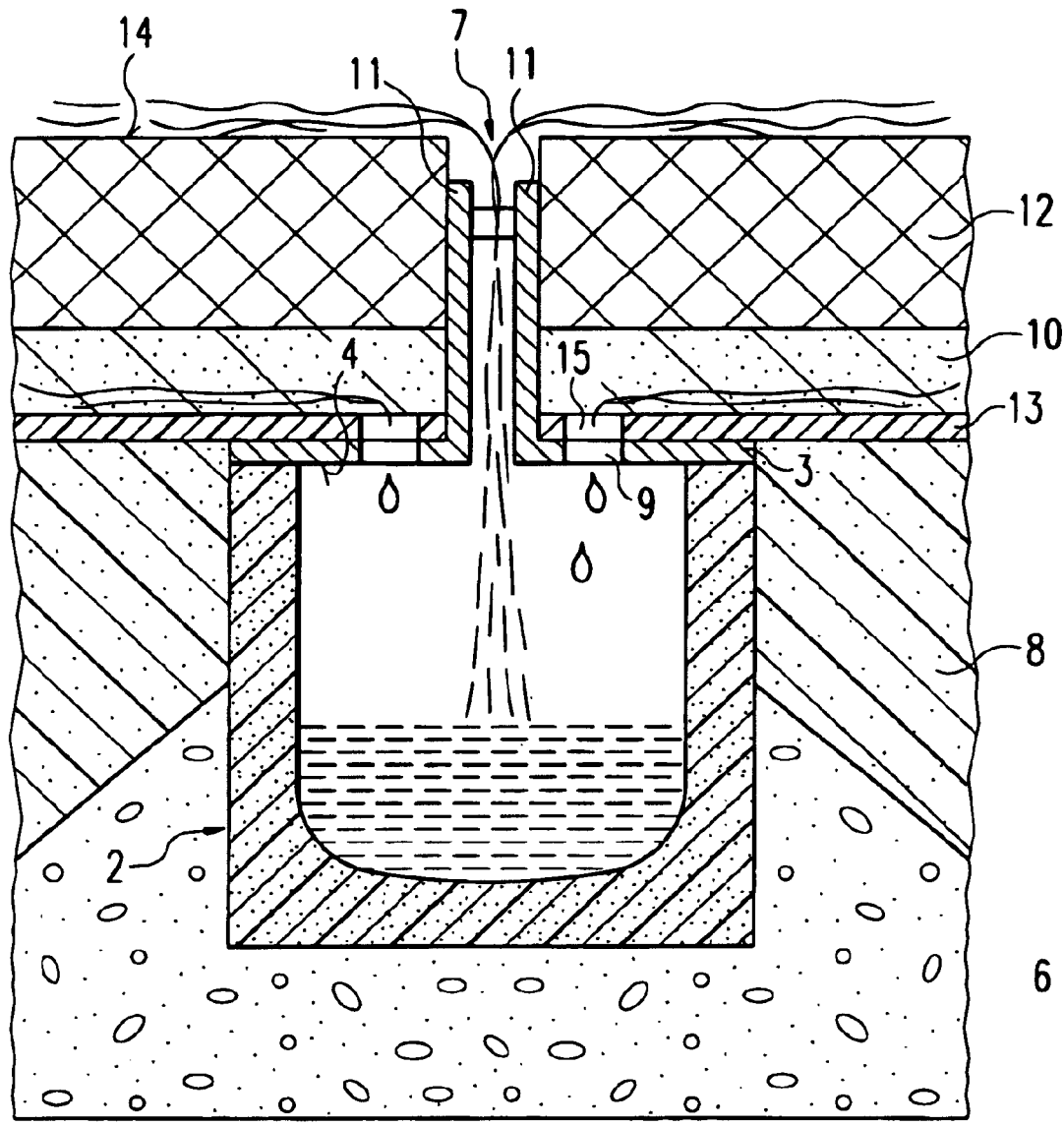
FIG. 3 is a schematic cross sectional view of a drainage arrangement embedded in the ground.

In the embodiment according to FIG. 3 a drainage arrangement embedded in the ground is shown along with the necessary layered structure of the ground. In this embodiment drainage channels 2 that are U-shaped in cross section and are made of concrete polymer, which is characterized by extreme durability and stability, are embedded in a concrete foundation 6. However, this retaining concrete foundation 6 ends below an opening 4 at the top of the drainage channel 2 and consequently is not visible in the finished surface. The cover 1 is set onto the opening 4 of the drainage channel 2 and is fixed thereto in a form-fitting manner. The projection 5 of the cover 1 defines an inlet 7 through which surface water that runs off the surface to be drained enters the drainage channel 2. The planar portion 3 of the cover 1 comprises supplementary apertures 9, which are disposed at regular intervals over the entire length of the planar portion 3.

The space above the concrete foundation 6 is filled in with a second water-impermeable concrete layer 8, which encloses the upper part of the drainage channel 2 and the planar portion 3 of the cover 1. Onto the second water-impermeable concrete layer 8 is laid the damp-proof sheet 13, which extends onto the planar portion 3 of the cover 1. By application of the damp-proof sheet 13 water that percolates down is prevented from penetrating into the concrete layer, so that its supporting function is not impaired. The damp-proof sheet 13 is fixed with adhesive to the planar portion 3. Openings 15 are then cut or impressed into the damp-proof sheet 13 at positions that correspond to the positions of the apertures 9 in the planar portion 3. Onto the damp-proof sheet 13 is laid a drain layer 10, so that the percolating water passes through the drain layer 10, through the openings 15 in the damp-proof sheet 13 and the corresponding apertures 9 in the planar portion 3, and into the drainage channel 2. Paving stones 12, which are used to pave the surface, are laid directly onto the drain layer 10 and adjacent to the upright plates 11 of the cover 1. The projection 5 of the cover 1, which extends towards the surface of the ground, serves as a supporting surface for the paving stones 12. The height of the projection 5 is made such that the upper surface of the pavement 14 is either above the edges of the upright plates 11 of the projection 5 or flush therewith. Hence the slot-shaped inlet 7, which is defined by the upright plates 11, is invisible and does not disrupt the pattern of the pavement.

When a drainage arrangement with the cover in accordance with the invention is used, it is particularly advantageous that on one hand the drainage of large paved surfaces occurs invisibly and, on the other hand, drainage at a lower, sealing level is also made possible.

LIST OF REFERENCE NUMERALS

1 Cover
2 Drainage channel
3 Planar portion
4 Opening at the top of the drainage channel
5 Projection
6 Concrete foundation
7 Inlet
8 Water-impermeable concrete layer
9 Apertures in the planar portion
10 Drain layer
11 Plates
11' Spacer
12 Pavement
13 Damp-proof sheet
14 Surface of the pavement
15 Openings in damp-proof sheet

What is claimed is:

1. A drainage arrangement with a cover for a drainage channel installed in the ground to drain a surface of an area, comprising:

a substantially planar portion constructed so as in use to be capable of covering an opening defined at the top of the drainage channel, the planar portion defining supplementary apertures to receive water that in use has percolated down, and a projection that extends upward substantially vertically from the planar portion and that defines an inlet through which water that rims off from the surface to be drained can enter the drainage channel, and a damp-proof sheet, wherein at least one edge region of the planar portion of the cover is covered by the damp-proof sheet that in use separates an upper pavement layer from a lower supporting layer of the area to be drained, and wherein the planar portion is substantially covered by the damp-proof sheet into which openings have been our such that the positions of the openings in the damn-proof sheet coincide with those of the apertures in the planar portion.

2. A drainage arrangement with a cover as claimed in claim 1, wherein the apertures are disposed on the planar portion at regular intervals and over its entire length.

3. A drainage arrangement with a cover as claimed in claim 1, wherein the projection is formed by two upright plates that define a drainage slot therebetween and are preferably disposed symmetrically with respect to a midplane of the cover, such that the supplementary apertures in the planar portion are distributed on both sides of the plates.

4. A drainage arrangement with a cover as claimed in claim 1, wherein the projection is formed by two upright plates that define a drainage slot therebetween and are disposed near one side edge of the cover such that the supplementary apertures are disposed on one side.

5. A drainage arrangement with a cover as claimed in claim 1, wherein the cover is made of stainless steel or galvanized steel.

6. A method of producing a drainage arrangement with a cover for a drainage channel installed in the ground to drain a surface of an area, comprising:

constructing a substantially planar portion capable of covering an opening defined at the top of the drainage channel, wherein the planar portion defines supplementary apertures to receive water that in use has percolated down, constructing a projection that extends upward substantially vertically from the planar portion and that defines an inlet through which water that runs off from the surface to be drained can enter the drainage channel, and covering at least one edge region of the planar portion by a damp-proof sheet that in use separates an upper pavement layer from a lower supporting layer of the area to be drained, wherein the damp-proof sheet is positioned after the cover has been set onto the drainage channel, and wherein after the damp-proof sheet has been put into place on the planar portion of the cover, openings are cut into the damp-proof sheet, the positions of which coincide with those of the apertures in the planar portion.

* * * * *